United States Patent
Oshima

Patent Number: 5,659,827
Date of Patent: Aug. 19, 1997

[54] CAMERA VIEWFINDER WITH EXCHANGEABLE BRIGHT FRAMES

[76] Inventor: Shigeru Oshima, 4-20-21 Fujimi-Cho, Chofu-shi, Tokyo, 182, Japan

[21] Appl. No.: 510,614

[22] Filed: Aug. 3, 1995

[51] Int. Cl.⁶ .............................. G03B 13/10; G03B 17/00
[52] U.S. Cl. .............................................. 396/380; 396/436
[58] Field of Search ........................ 354/94, 159, 222; 396/378, 380, 435, 436

[56] References Cited

U.S. PATENT DOCUMENTS

| | | | |
|---|---|---|---|
| 4,973,997 | 11/1990 | Harvey | 354/106 |
| 5,021,815 | 6/1991 | Harvey | 354/222 |
| 5,059,994 | 10/1991 | Harvey | 354/222 |
| 5,257,055 | 10/1993 | Cho et al. | 354/222 |
| 5,410,381 | 4/1995 | Kameyama et al. | 354/222 |
| 5,430,517 | 7/1995 | Zander | 354/222 |
| 5,495,367 | 2/1996 | Morooka | 359/674 |

*Primary Examiner*—Safet Metjahic
*Assistant Examiner*—John Chizmar
*Attorney, Agent, or Firm*—Roth & Goldman

[57] ABSTRACT

A still camera viewfinder comprising a reticle lens having more than one frame thereon and which is selectively positionable in the viewing area, and viewing area masking plate arms which are coupled to said reticle lens to open or selectively mask portions of the viewing area dependent upon the film format or lens in use.

2 Claims, 2 Drawing Sheets

CAMERA VIEWFINDER WITH EXCHANGEABLE BRIGHT FRAMES

This invention relates to a viewfinder for a still camera which enables a user to change the size and shape of the frame for the viewing area according to the film format or to the lens in use.

BACKGROUND OF THE INVENTION

There are still cameras with which users can obtain, adding to the standard film format pictures, pictures of other formats such as panoramic and HDTV (High-Density TV) format, and there are cameras which can use interchangeable lenses such as telephoto lenses and wide angle lenses having variable focal length.

In such a still camera, whenever the film format is changed or the lens is changed, the viewing area and size of the view finder frame must be changed according to the format or the lens in use to cover the proper viewing and picture taking areas.

FIG. 1 shows a typical viewfinder which is comprised of an object lens (1), a mirror lens (2), a reticle (frame line) lens (3) and an eyepiece lens (4).

To have more than one size of frame with a viewfinder matching with more than one film format or more than one interchangeable lens, the frames are usually provided on one reticle overlapping each other or placing a smaller frame in a bigger frame.

FIG. 2 shows typical frames provided on a reticle lens for three different kinds of film format, which is a frame for the standard 35 mm format (5), a frame for panorama format (6) and a frame for HDTV format (7), showing the viewing area of each format indicated by the frames provided on one reticle lens.

FIG. 3 shows the typical frames provided on a reticle lens for three different kinds of lens, which is a frame for standard lens (8), a frame for wide angle lens (9) and a frame for telephoto lens (10), showing the viewing area of each lens indicated by the frames provided on one reticle lens.

As shown by FIG. 2 and 3, if more than one frame is provided on a single reticle lens overlapping each other or with a smaller frame put in a bigger frame, users always see all of them simultaneously and may experience confusion, complication and difficulty of frame distinction.

SUMMARY OF THE INVENTION

The primary object of the present invention is to provide a view finder for a camera capable of taking pictures in more than one film format and for a camera which is capable of using more than one lens wherein the viewfinder displays only one visible frame at a time which matches with the selected format or the lens in use.

The viewfinder of the present invention is comprised of an object lens, a mirror lens, a reticle lens which has broader width than ordinary reticle lenses to have enough room for more than one frame to be displayed, and an eyepiece lens.

Because of the broader width of the reticle lens, multiple frames can be arranged side by side on the reticle lens without any overlapping and without placing a smaller frame in a bigger frame.

By moving the reticle lens from right to left or left to right coupling the selection of the film format or the lens, only one frame is visible at a time in the viewfinder and the visible frame which matches with the selected film format or the lens in use.

Thus, although the camera has more than one film format or more than one lens to be used, the user will always see only one frame in the viewfinder without any confusion, complication and difficulty of frame distinction caused by seeing multiple frames in the viewing area at a time.

This and other objects, advantages and features of the present invention will be more fully understood and appreciated by reference to the written specification.

BRIEF DESCRIPTION OF THE DRAWINGS

FIG. 1
1. Object lens
2. Mirror lens
3. Reticle lens
4. Eyepiece lens

FIG. 2
5. Frame for standard 35 mm format
6. Frame for panorama format
7. Frame for HDTV format FIG. 3
8. Frame for standard lens
9. Frame for wide lens
10. Frame for telephoto lens FIG. 4
11. Object lens
12. Mirror lens 13. Reticle lens with broader width
14. Eyepiece lens

FIG. 5A

Figure 1:
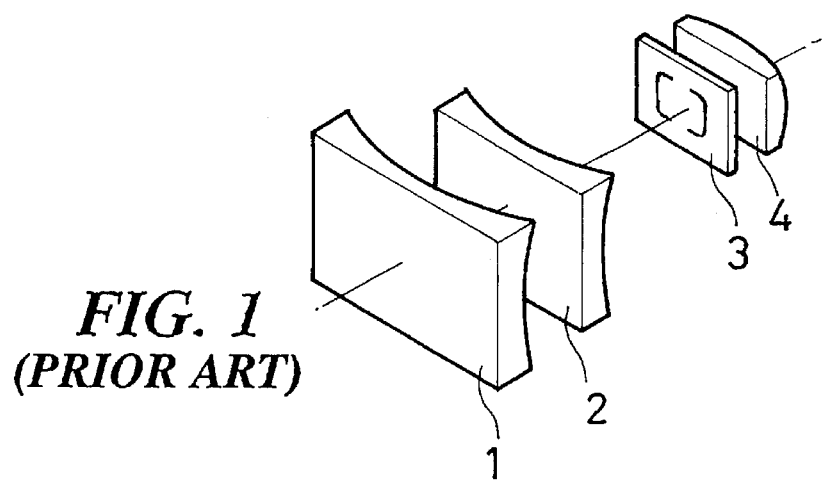
FIG. 1 shows typical prior art viewfinder which is comprised of an object lens, a mirror lens, a reticle (frame line) lens and an eyepiece lens.
Figure 2:
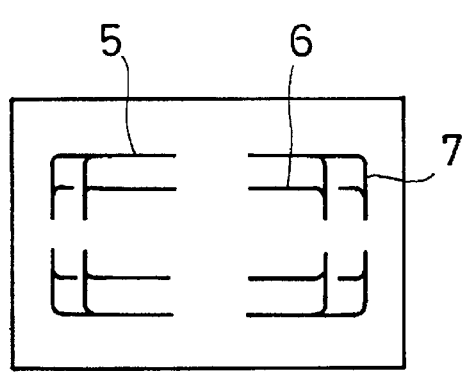
FIG. 2 show the typical prior art frames provided on a reticle lens for three different kinds of film formats, a first comprising a frame for a standard 35 mm format, a second comprising a frame for panoramic format and a third comprising a frame for HDTV format, showing the viewing area of each format indicated by the various frames all provided on the reticle lens.
Figure 3:
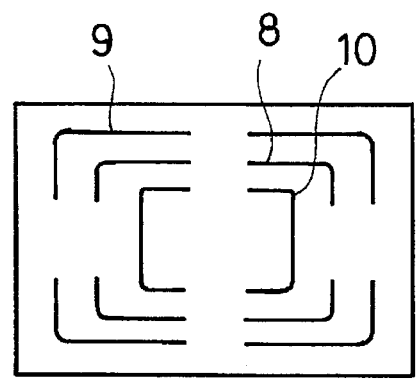
FIG. 3 shows the prior art frames provide on a reticle lens for three different kinds of lenses, the first comprising a frame for standard lens, the second a frame for wide angle lens and the third comprising a frame for telephoto lens, showing the viewing area of each lens indicated by the various frames on the reticle lens.

15. Object lens
16. Mirror lens
17. Eyepiece lens
18. Reticle lens with two frames
19. Panorama format frame
20. 35 mm standard format frame
21. Lever
22. Upper gear
23. Pin
24. Upper rack
25. Upper masking arm
26. Lower gear
27. Lower rack
28. Lower masking arm
29. Picture taking lens

FIG. 5B

19. Panorama format frame
25. Upper masking arm
28. Lower masking arm

DETAILED DESCRIPTION OF THE INVENTION

Figure 4:
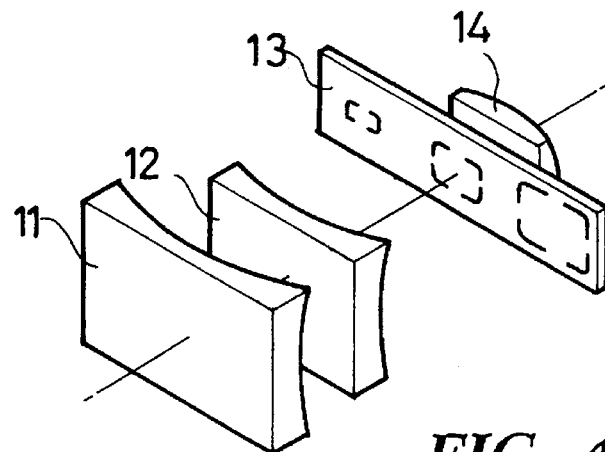
FIG. 4 show the view finder of the present invention which is comprised of an object lens, a mirror lens, a reticle lens which has a broader width than ordinary reticle lenses to have enough room for more than one frame to be provided separately and juxtaposed, and an eyepiece lens.

With reference to FIG. 4 the viewfinder of the present invention is comprised of an object lens (11), a mirror lens (12), a reticle lens (13) which has broader width than ordinary reticle lenses to have enough room for more than one frame to be provided separately and juxtaposed, and an eyepiece lens (14).

The reticle lens (13) can move from right to left or left to right so that one of the frames provided on the reticle lens (13) can be selected and fixed in the viewing position. The reticle lens (13) is moved to a position dependent upon the selected format or the selected one of interchangeable lenses.

Whenever a format is selected or a lens is selected and fixed in position, one of the frames provided on the reticle lens (13) which matches with the selected format or the selected lens is placed in the viewing position. Also, whenever a specific frame is selected from the various frames provided on the reticle lens (13) and is fixed in the viewing position, frame marks establishing the size of the viewing area dependent upon the selected one of the formats or lenses are moved into the corresponding picture taking position.

Figure 5A:
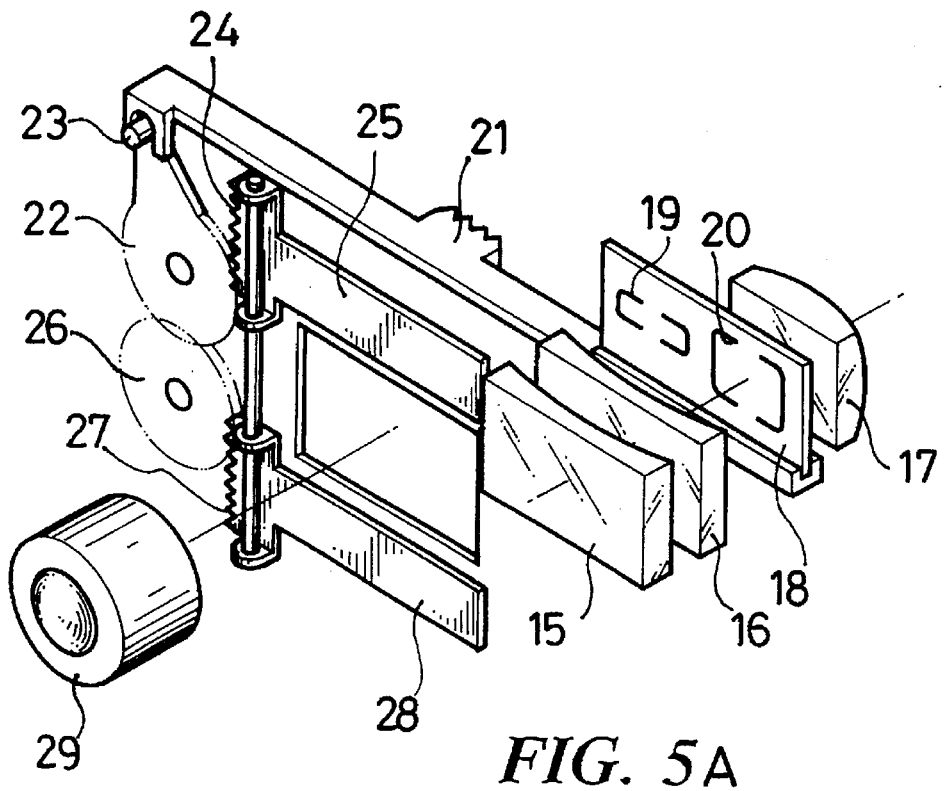
FIG. 5A shows an example of the present invention with the mechanism which changes the film format coupling the sliding movement of the reticle lens with the 35 mm format frame in the viewing position keeping an upper masking arm pulled up and a lower masking are pulled to fully expose the film plane for a full size 35 mm format.

FIG. 5A shows an example of the viewfinder of the present invention with the mechanism which changes the film format coupling to the sliding movement of a reticle lens (18) and in its state that the 35 mm format frame is in the viewing position keeping the upper masking arm pulled up and the lower masking arm pulled down not to cover any part of film plane keeping the film plane entirely open for a full size 35 mm format.

As shown in FIG. 5A, the viewfinder is comprised of an object lens (15), a mirror lens (16), an eyepiece lens (17) and a reticle lens (18) which has broader width than ordinary reticle lenses, on which the frame of a panorama format (19) and the frame of a 35 mm standard format (20) are provided separately and juxtaposed, and the reticle lens (18) is fixed on a lever (21) which slides left to right or right to left, and the lever with the reticle lens (18) is connected with an upper gear (22) through a pin (23) provided on the upper gear, and the upper gear engages with an upper rack (24) provided on an upper masking arm (25) and also engages with a lower gear 926) which engages with a lower rack (27) provided on a lower masking arm (28).

In the mechanism shown in FIG. 5A, when the lever (21) moves left to right, the upper gear (22) rotates clockwise and the rotation is transferred to the upper rack (24) and the upper rack (24) moves down and the upper masking arm (25) comes down, and at the same time the rotation of upper gear is also transferred to the lower gear (26), and the lower gear rotates counterclockwise and moves the lower rack (27) up and the lower masking arm (28) moves up too, thus when the panoramic frame is selected and comes in the viewing position, the film plane is covered by the masking arms so that the film plane may form the panoramic format instead of the full size 35 mm format.

Figure 5B:
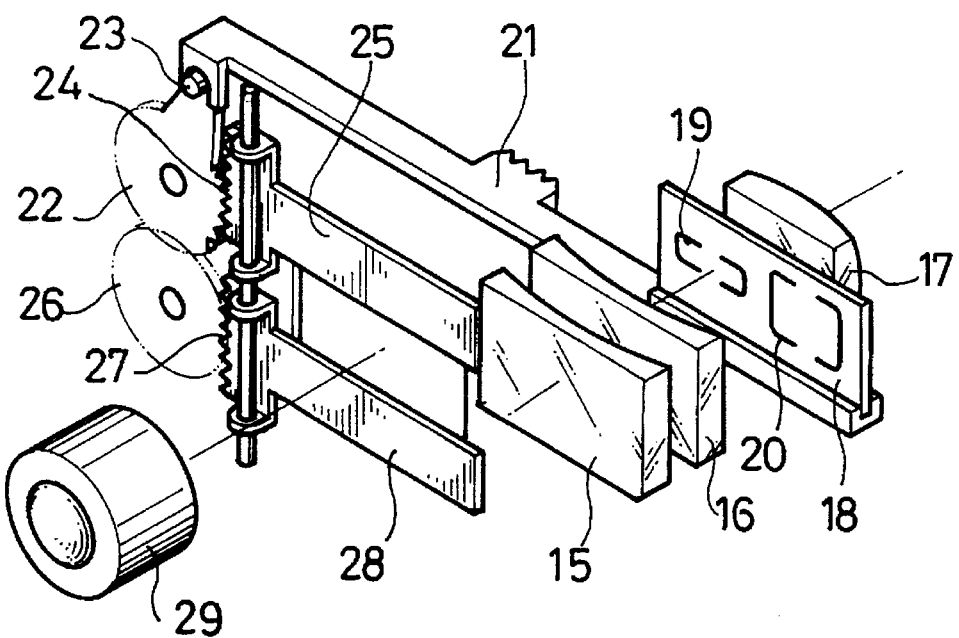
FIG. 5B shows an example of the viewfinder of the present invention with the mechanism which changes the film format coupling the sliding movement of the reticle lens with the panorama format frame in the viewing position keeping the upper and lower part of the film plane to form the panorama format instead of the full size 35 mm format. Notations The various parts shown in the drawings are identified with reference numerals as follows.

As can be seen in FIG. 5B, the viewfinder of the present invention is shown with the format changing mechanism changed from the state of FIG. 5a in which 35 mm format frame is in position, to the state in which the panorama frame is in position and the film plane is covered by the panorama masking arms to define the panorama format on the film plane.

From the above, it will be apparent to one skilled in the art that various alternatives to the embodiments described may be employed without departing from the principles of the invention.

What is claimed is:

1. A viewfinder for a still camera for taking pictures in more than one film format or with more than one lens to enable the viewfinder to display a single visible frame in a viewing area dependent upon the format or the lens in use, which comprises:

(a) a fixed object lens;
    (b) a fixed mirror lens;
    (c) a moveable reticle lens having a plurality of visible frames thereon without frame overlapping and without placing a smaller frame in a larger frame and which moves along a first path of movement so that a single one of the frames on the reticle lens can be placed in the viewing position at a time;
    (d) a fixed eyepiece lens; and
    (e) masking means operatively coupled to means for moving said reticle lens, said masking means being moveable along a second path of movement to open or selectively mask portions of the viewing area dependent upon the selected format or lens and wherein said reticle lens is moveable back and forth in a linear path and said masking means comprises a pair of masks which move toward and away from each other in a direction substantially transversely to said linear path.

2. The viewfinder of claim 1, wherein said masks each have a gear rack thereon engageable with gears which are rotated by said means for moving said reticle lens, said racks being mounted for movement on a common axis arranged transversely to the direction of movement of said means for moving said reticle lens.

* * * * *